C. W. CARTER.
DUMP WAGON.
APPLICATION FILED APR. 21, 1919.
1,331,899.
Patented Feb. 24, 1920.
2 SHEETS—SHEET 1.
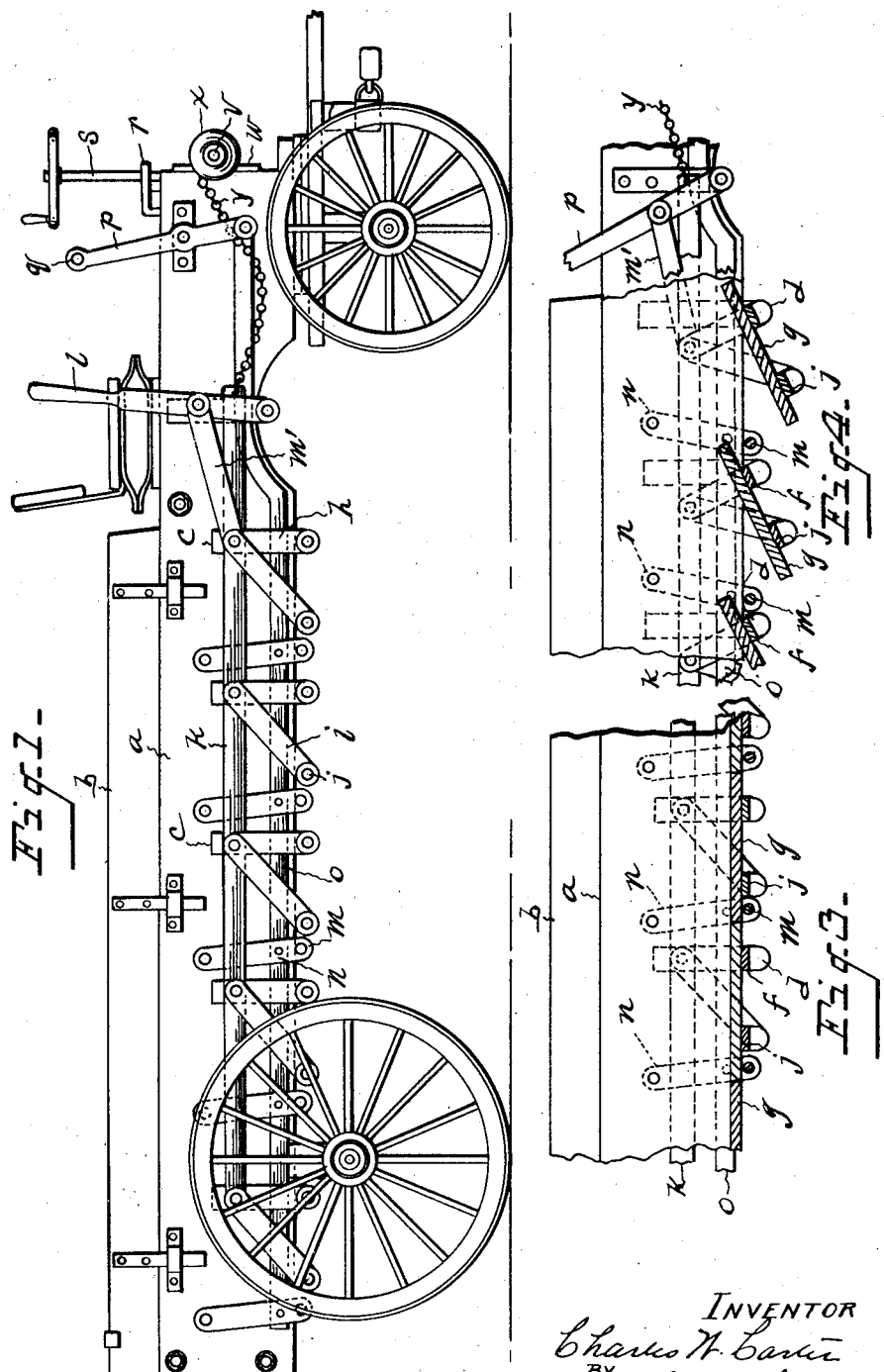
INVENTOR
Charles W. Carter
BY
Stuart & Barnes
HIS ATTORNEY.

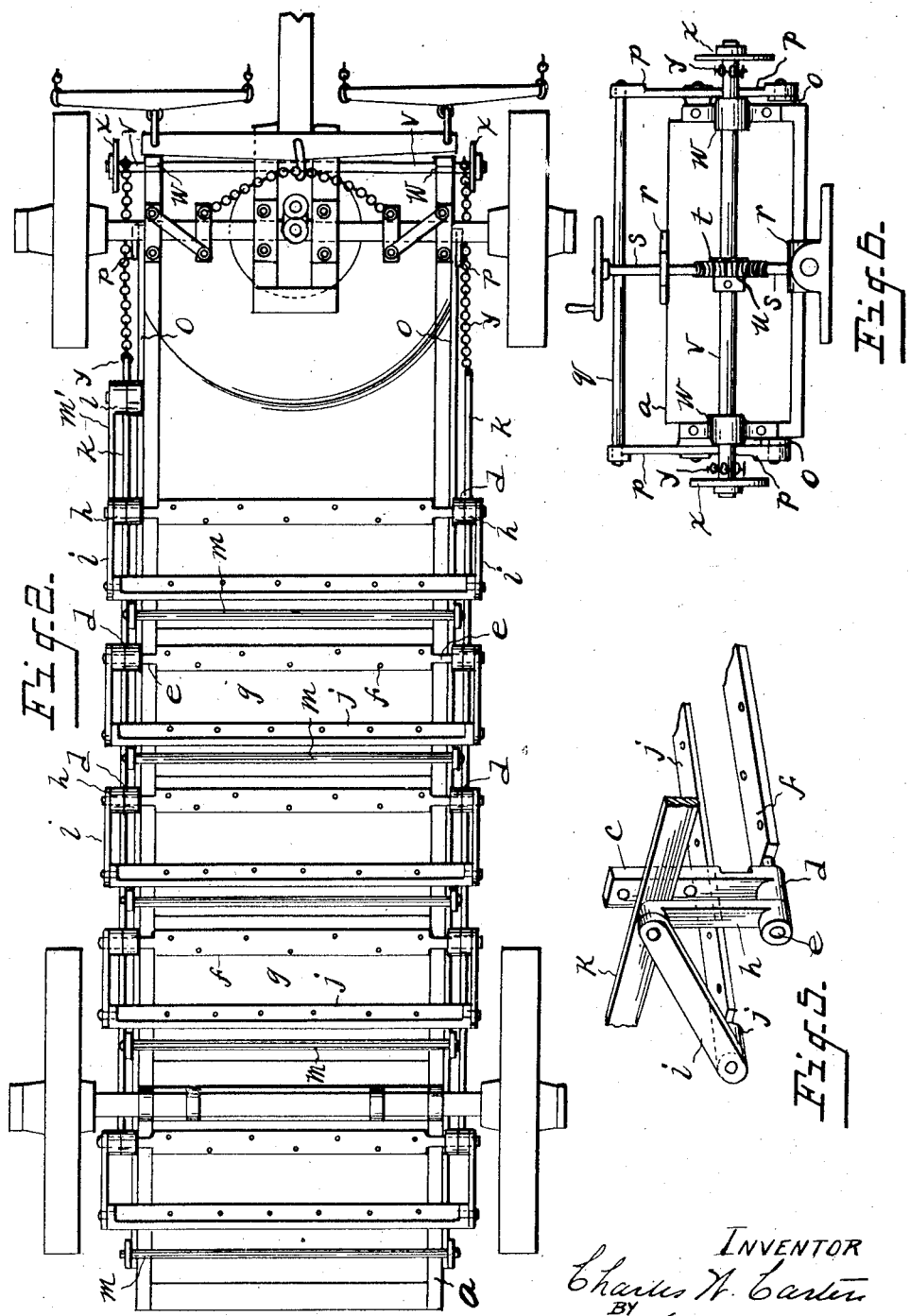

UNITED STATES PATENT OFFICE.

CHARLES W. CARTER, OF HIGHLAND PARK, MICHIGAN.

DUMP-WAGON.

1,331,899.  Specification of Letters Patent.  Patented Feb. 24, 1920.

Application filed April 21, 1919. Serial No. 291,506.

*To all whom it may concern:*

Be it known that I, CHARLES W. CARTER, a citizen of the United States, residing at Highland Park, in the county of Wayne and State of Michigan, have invented certain new and useful Improvements in Dump-Wagons, of which the following is a specification.

This invention relates to dump wagons or broadly to dump bodies of any character. It has for its object a dump body of the character that dumps along the entire length of the box by the letting down of a plurality of sections of the bottom. Instead of allowing the complete load to descend almost instantly in a pile along the entire length of the box, as would be otherwise the case, my improvement embraces a control which allows the driver to distribute the load and scatter it over a desired area. This end is accomplished by means of an arrangement of control devices specially designed and applicable to a body which dumps in the fashion indicated. This will more fully appear in the specification following.

In the drawings,—

Figure 1 is a side elevation of a wagon provided with the dumping connections and controls.

Fig. 2 is a bottom plan view of the same.

Fig. 3 is a fragmentary longitudinal section of the wagon box showing the bottom sections in closed position.

Fig. 4 is a similar view showing the bottom sections in open position.

Fig. 5 is an enlarged perspective of a fragment of the control system.

Fig. 6 is a front elevation of the wagon box.

$a$ designates the wagon box; $b$ a removable section that may enlarge its cubical capacity in a familiar way. Secured to each side of the wagon box are a plurality of hangers $c$ which have journal bearings $d$ in which the cylindrical ends $e$ of the cross straps $f$ are journaled (Fig. 5). These cross straps $f$ are riveted or screwed onto the bottom of the floor sections $g$ of the box and hence the floor sections are hinged in the bearings of the hangers $c$. There is also secured on the cylindrical ends $e$ of the cross straps $f$ levers $h$, which at their upper ends have pivoted thereto the links $i$, whose lower ends carry the cross bars $j$ that are riveted or screwed to the floor sections $g$. $k$ is a reach bar which is pivoted to all of the levers $h$ at their tops with the same pivot pin that connects the lever $h$ with the link $i$. $l$ is a hand lever pivoted to the wagon box at the front thereof within reach of the driver of the seat. The draw link $m'$ connects this lever with the front lever $h$. This lever serves only to lift the sections up to their horizontal position where they may be locked in place by the cross rods $m$ (one for each section), being swung forward on their pivoted hanger arms $n$, which are all connected by one common to and fro bar $o$, whose forward end is pivoted to the bottom of the locking lever $p$ at the forward end of the wagon box.

There is a system of hangers, levers and links on each side of the box and likewise there is a system of hanger arms and to and fro bars on each side. The sections themselves serve to communicate the effort applied to the right hand side of the body to the operating members on the left hand side of the body. With the cross rods that act to lock the sections in raised position, the effort given the to and fro bars is given equally on each side at the front, as there is a locking lever $p$ at each side (see Fig. 6), connected by the bar $q$.

The operation of the controls for the dumping sections will be easily understood now. When it is desired to make a dump, the driver simply pushes or kicks forward on the connecting bar $q$ that connects the two locking levers $p$. This forces backward the to and fro bars $o$, thereby forcing the cross rods $m$ backward so that they are removed from under the portions of the sections that drop down. This allows these sections to drop down and dump. After the dump has been made, the operator raises all the sections by pushing forward on the lever $l$, which through the reach bar $k$ operates all the levers $h$ and the links $i$ to raise the lowered portions of each floor section. When they reach the horizontal position the locking levers may be drawn backward by pulling on the connecting bar $q$ and this again places the cross rods $n$ underneath those portions of the sections which lower so as to form a continuous flooring for the dump body.

On the front of the wagon box on the dash of the wagon I have a pair of brackets $r$ which rotatably support the hand wheel rod $s$ that is provided with a worm $t$ that meshes with the spiral gear $u$ on the shaft $v$ carried in journals $w$ on the front of the wagon. The outer ends of this shaft are provided with collars $x$ to provide a space intervening between the brackets $w$ and the collars $x$ to form spools for the chains $y$ that are connected with the forward ends of the reach bars $k$ on each side. This is a control for regulating the distribution and scattering of the dump, whereby turning the hand wheel to take up more or less of the chain $y$, the permissible backward movement of the reach bar $k$ is regulated and this in turn regulates through the levers $h$ and the links $i$, the amount of possible drop that the sections may take, as shown in Fig. 4, where it will be seen that the sections only drop part way while that part of the chain that is shown is taut. This means that at this position they come to a stop. It is possible by winding up more of the chain on the spool ends of the shaft $b$, to permit even less of a drop of the sections and hence the openings will be much less. Consequently the dirt or other material being carried will be dumped very much less rapidly, and by keeping the wagon in motion it can be scattered as desired.

What I claim is:

1. A dump body, having in combination, a box provided with a plurality of transversely pivoted floor sections, a plurality of levers for raising said floor sections, a common reach bar for the same running to the front of the body where it may be operated by the driver, a plurality of hanger arms supported by the sides of the box, rods connecting the same across the body underneath, a common to and fro bar connecting the said hanger arms whereby they may be operated from the front of the body to lock or release the floor sections, and means for limiting the movement of the reach bar to govern the opening of the floor sections, comprising a hand wheel, worm drive, a spool and a chain winding over the spool and connected with the reach bar.

2. A dump body, comprising a box having a plurality of transversely pivoted floor sections, levers pivoted at the sides of the box and links for controlling the raising of the floor sections, a common reach bar connecting the links and levers, a chain connecting with the end of the reach bar, a spool over which the chain winds which may be wound up more or less to limit the amount of permissible backward movement of the reach bar, a worm and spiral gear for governing the possible movement of the chain and for turning the spool, and means for locking the floor sections in their upward positions.

In testimony whereof I affix my signature.

CHARLES W. CARTER.